United States Patent
Yan et al.

(10) Patent No.: US 10,770,731 B2
(45) Date of Patent: Sep. 8, 2020

(54) POSITIVE ELECTRODE CURRENT COLLECTOR AND PREPARATION METHOD AND USE THEREOF

(71) Applicant: Chongqing Jinmei New Material Technology Co., Ltd., Chongqing (CN)

(72) Inventors: Zuoyi Yan, Anhui (CN); Wenqing Liu, Anhui (CN)

(*) Notice: Subject to any disclaimer, the term of this patent is extended or adjusted under 35 U.S.C. 154(b) by 99 days.

(21) Appl. No.: 16/052,603

(22) Filed: Aug. 1, 2018

(65) Prior Publication Data
US 2020/0044258 A1 Feb. 6, 2020

(51) Int. Cl.
H01M 4/66 (2006.01)
H01M 4/04 (2006.01)
H01M 4/02 (2006.01)

(52) U.S. Cl.
CPC ......... *H01M 4/667* (2013.01); *H01M 4/0423* (2013.01); *H01M 4/661* (2013.01); *H01M 4/664* (2013.01); *H01M 4/668* (2013.01); H01M 2004/028 (2013.01)

(58) Field of Classification Search
CPC ...... H01M 4/661; H01M 4/667; H01M 4/668; H01M 4/0423
USPC ......................................................... 429/245
See application file for complete search history.

(56) References Cited

U.S. PATENT DOCUMENTS

| | | | | |
|---|---|---|---|---|
| 7,446,998 B2 * | 11/2008 | Kazaryan | ............... | H01G 11/22 361/502 |
| 8,399,113 B2 * | 3/2013 | Nakura | ............... | H01M 2/348 429/163 |
| 8,808,921 B2 * | 8/2014 | Park | ............... | H01M 4/13 429/234 |
| 8,815,444 B1 * | 8/2014 | Tomantschger | ......... | H01M 4/14 429/211 |
| 9,077,040 B2 * | 7/2015 | Honda | ............... | H01M 4/667 |
| 9,142,811 B2 * | 9/2015 | Chami | ............... | H01M 2/26 |
| 2009/0317710 A1 * | 12/2009 | Douglas | ............... | H01M 2/0275 429/163 |
| 2013/0045427 A1 * | 2/2013 | Zhamu | ............... | H01M 4/38 429/403 |
| 2013/0058009 A1 * | 3/2013 | Kim | ............... | H01G 11/28 361/502 |
| 2014/0147746 A1 * | 5/2014 | Tanaka | ............... | H01M 4/667 429/211 |

(Continued)

*Primary Examiner* — Amanda C. Walke
(74) *Attorney, Agent, or Firm* — Prakash Nama; Global IP Services, PLLC

(57) ABSTRACT

The present invention provides a positive electrode current collector, and a preparation method and use thereof. The positive electrode current collector is of a multilayered structure and comprises a plastic thin film, wherein the upper and lower surfaces of the plastic thin film are coated with a bonding force enhancement layer, an aluminum metal coating layer and an anti-oxidization layer in sequence. The preparation method comprises the steps of coating the bonding force enhancement layer, the aluminum metal coating layer and the anti-oxidization layer in sequence through an evaporation film-coating process. Use of the positive electrode current collector in a lithium ion battery is further provided. By virtue of the positive electrode current collector according to the present invention, light weight and improved energy density of the battery is realized, and the aluminum coating layer is not easily peeled off, and insusceptible to oxidization.

11 Claims, 1 Drawing Sheet

(56) References Cited

U.S. PATENT DOCUMENTS

| | | | |
|---|---|---|---|
| 2014/0162122 A1* | 6/2014 | Kato | H01M 4/13 |
| | | | 429/212 |
| 2015/0155564 A1* | 6/2015 | Chami | H01M 10/0585 |
| | | | 429/149 |
| 2015/0318555 A1* | 11/2015 | Oku | B32B 15/085 |
| | | | 429/245 |
| 2018/0261886 A1* | 9/2018 | Picard | C07C 309/76 |
| 2019/0173093 A1* | 6/2019 | Liang | H01M 4/667 |
| 2019/0245210 A1* | 8/2019 | Matsushita | H01M 4/668 |

* cited by examiner

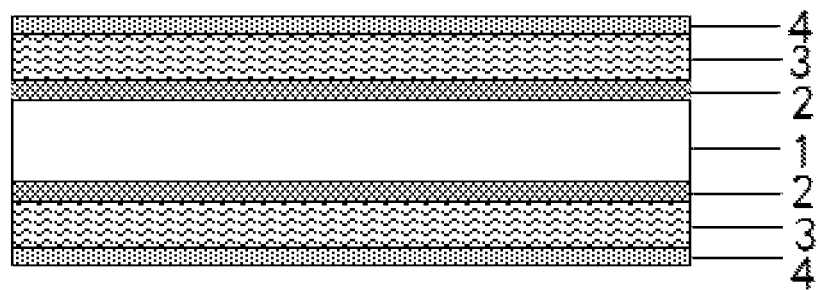

POSITIVE ELECTRODE CURRENT COLLECTOR AND PREPARATION METHOD AND USE THEREOF

TECHNICAL FIELD

The present invention relates to a positive electrode current collector, a preparation method and use thereof.

BACKGROUND

The positive electrode current collectors in typical lithium ion batteries are aluminium foils. With the advancement of lithium ion battery technologies, lithium ion batteries with high energy density, light weight, and flexibility are desired. Light weight and improved energy density of the lithium ion batteries can be achieved by thinning the aluminum foil. However, due to the limitations from the manufacturing technology, the thickness of the aluminum foil can hardly be reduced (currently, the aluminum foil can be mass-produced at a thickness of 8 μm). Further, after the aluminum foil is thinned, the mechanical strength is reduced, resulting in a deteriorated processability. Therefore, there is a need for a new "thinning technique".

In the prior art, aluminum is coated on a plastic (e.g., PET) and used as a current collector to increase the energy density, reduce the cost, and reduce the weight of the battery. However, the maximum thickness of the aluminum coating layer is up to 2.0 μm (where a thickness is needed to achieve a satisfactory conductivity), which is much larger than the thickness of an aluminum coating layer on a traditional packaging material. With increasing thickness of the coating layer, the aluminum coating layer becomes more prone to falling off from the plastic.

In addition, the surface of the aluminum foil needs to be protected from oxidation because the aluminum foil is in direct contact with the positive electrode material, and is corroded by the electrolyte solution after use for a long time, resulting in a reduced service life of the lithium ion battery. It is found that after aluminum is directly coated on a plastic, the aluminum coating layer may easily fall off if a conventional anti-oxidation method is used.

SUMMARY

In view of this, in an aspect, the present invention provides a positive electrode current collector with which light weight, improved energy density, and reduced cost of a battery is achieved and in which an aluminum coating layer is not easily peeled off, and insusceptible to oxidization, thereby solving the above technical problems.

In another aspect, the present invention provides a method for preparing a positive electrode current collector.

In a third aspect, the present invention provides use of the positive electrode current collector.

The present invention provides a positive electrode current collector, which is of a multilayered structure and comprises a plastic thin film, where the upper and lower surfaces of the plastic thin film are coated with a bonding force enhancement layer, an aluminum metal coating layer and an anti-oxidization layer in sequence.

Further, the plastic thin film is OPP, PI, PET, CPP or PVC.

Further, the plastic thin film has a thickness of 2-12 μm.

Further, the bonding force enhancement layer is a metallic coating or a nonmetallic coating. When the bonding force enhancement layer is a metallic coating, the metal is Ni; and when the bonding force enhancement layer is a nonmetallic coating, the nonmetal is SiC, $Si_3N_4$, or $Al_2O_3$.

Further, the bonding force enhancement layer has a thickness of 10-100 nm.

Further, the aluminum metal coating layer has a thickness of 100-2000 nm.

Further, the anti-oxidization layer is a dense metallic or nonmetallic layer. When the anti-oxidization layer is a metallic layer, the metal is Ni; and when the anti-oxidization layer is a nonmetallic layer, the nonmetal is $Al_2O_3$, $Si_3N_4$, or SiC.

Further, the anti-oxidization layer has a thickness of 10-100 nm.

The present invention provides a method for preparing a positive electrode current collector, which comprises the steps of:

S1: treating surfaces of a plastic thin film to be coated with corona, then feeding the plastic thin film which is in a wound form to a vacuum chamber in a double-side roundtrip electron beam evaporation coating machine, sealing the vacuum chamber, evacuating gradually to a vacuum level of $3\times10^{-3}$ to $6\times10^{-3}$ Pa, bombarding evaporation material $Al_2O_3$ with accelerated electrons by using an electron gun, and adjusting unwinding speed, rewinding speed and evaporation rate, with the $Al_2O_3$ absorbing heat and being vaporized, to form a layer of $Al_2O_3$ coating, that is, the bonding force enhancement layer, on the surfaces of the moving thin film;

S2: feeding the thin film coated with $Al_2O_3$ obtained in step S1 to the vacuum chamber of the double-side roundtrip electron beam evaporation coating machine, sealing the vacuum chamber, evacuating gradually to a vacuum level of $4\times10^{-2}$ to $6\times10^{-2}$ Pa, heating an evaporation device to 1300° C.-1400° C., then delivering aluminum to the evaporation device, and adjusting unwinding speed, rewinding speed, and evaporation rate, with the aluminum being persistently melted and evaporated in the evaporation device, to form a layer of aluminum coating, that is, the aluminum metal coating layer, on the surfaces of the moving thin film; and S3: feeding the thin film coated with aluminum obtained in S2 to the vacuum chamber of the coating machine, sealing the vacuum chamber, evacuating gradually to a vacuum level of $3\times10^{-3}$ to $6\times10^{-3}$ Pa, bombarding evaporation material $Al_2O_3$ with accelerated electrons by using an electron gun, and adjusting unwinding speed, rewinding speed and evaporation rate, with the $Al_2O_3$ absorbing heat and being vaporized, to form a layer of $Al_2O_3$ coating, that is, the anti-oxidization layer, on the surfaces of the moving thin film.

Use of the positive electrode current collector in batteries and particularly in lithium ion batteries is also provided in the present invention.

The present invention has the following beneficial effects.

(1) Weight reduction is achieved by means of the plastic thin film layer, where the aluminum coated film collector can achieve a weight reduction of 50%, and a thickness reduction of 30%, whereby the energy density of the battery is significantly improved.

(2) The plastic thin film, as a substrate, has strong tensile strength, so that the tension, pressure and other windows in the preparation process are widened. Therefore, in the preparation procedure, a higher pressure can be applied to achieve a greater compaction density, thereby improving the manufacturing capability of the process.

(3) The bonding force enhancement layer is coated, which can reduce the exfoliation of the aluminum metal coating layer, and effectively prevent the loss of performances of the collector caused by the potential peeling off of the aluminum metal coating layer.

(4) The anti-oxidation layer is coated, with which the problem that the aluminum coating on the plastic trends to peel off is solved, and the purpose of preventing oxidation is achieved.

BRIEF DESCRIPTION OF THE DRAWINGS

In order to explain the technical solutions in the embodiments of the present invention or in the prior art more clearly, the drawings used in the description of the embodiments or the prior art will be briefly described below. Apparently, the drawing depicted below is merely for the preferred embodiment of the present invention, and those skilled in the art can obtain other embodiments based on the drawing without any creative efforts.

The sole FIGURE schematically shows a positive electrode current collector having a multilayered structure according to the present invention.

DESCRIPTION OF THE EMBODIMENTS

The technical solution in the embodiment of the present invention will be described clearly and fully with reference to the accompanying drawing in the embodiment of the present invention. Apparently, the embodiment described is merely preferred embodiment, rather than all of the embodiments of the present invention. All other embodiments obtained by a person of ordinary skill in the art without creative efforts based on the embodiment of the present invention shall fall within the protection scope of the present invention.

As shown in the sole FIGURE, a positive electrode current collector is provided, which is of a multilayered structure and comprises a plastic thin film 1, where the upper and lower surfaces of the plastic thin film 1 are coated with a bonding force enhancement layer 2, an aluminum metal coating layer 3 and an anti-oxidization layer 4 in sequence.

Weight reduction is achieved by means of using the plastic thin film layer, where the aluminum coated film collector can achieve a weight reduction of 50%, and a thickness reduction of 30%, whereby the energy density of the battery is significantly improved. The plastic thin film is preferably OPP, PI, PET, CPP, or PVC. OPP is an orientedly stretched polypropylene plastic; PI is a polyimide plastic; PET is a polyethylene terephthalate plastic, CPP is a cast polypropylene plastic, and PVC is a polyvinyl chloride plastic. PET, PI, and CPP are further preferred. The plastic thin film preferably has a thickness of 2-12 µm, and further preferably has a thickness of 6-10 µm. The heat resistance of the plastic film is 120-300° C.

The coated bonding force enhancement layer can reduce the exfoliation of the aluminum metal coating layer, and effectively prevent the loss of performances of the collector caused by the potential exfoliation of the aluminum metal coating layer. The bonding force enhancement layer is preferably a metallic coating or a nonmetallic coating. When the bonding force enhancement layer is a metallic coating, the metal is Ni; and when the bonding force enhancement layer is a nonmetallic coating, the nonmetal is SiC, $Si_3N_4$, or $Al_2O_3$, and further preferably $Al_2O_3$. $Al_2O_3$ can be well bonded to the plastic thin film and the aluminum metal coating layer, such that the aluminum metal coating layer can hardly peel off. The bonding force enhancement layer preferably has a thickness of 10-100 nm and further preferably has a thickness of 10-50 nm.

The aluminum metal coating layer preferably has a thickness of 100-2000 nm, and further preferably has a thickness of 500-1000 nm.

The anti-oxidization layer serves to or aims to protect the aluminum metal coating layer against oxidization. The anti-oxidization layer may be a dense metallic or nonmetallic layer. When the anti-oxidization layer is a metallic layer, the metal is Ni; and when the anti-oxidization layer is a nonmetallic layer, the nonmetal is $Al_2O_3$, $Si_3N_4$, or SiC, and $Al_2O_3$ is further preferred. Since the anti-oxidation layer is adopted by coating, the problem that the aluminum coating on the plastic trends to peel off is solved, and the purpose of preventing oxidation is achieved. The anti-oxidization layer has a thickness of 10-100 nm, and 10-50 nm is further preferred.

The present invention will be further described by way of a specific example.

Example 1

A method for preparing a positive electrode current collector is provided, which comprises the steps of:

Step S1: treating the surfaces of a plastic thin film to be coated with corona, then feeding the wound plastic thin film to a vacuum chamber in a double-side roundtrip electron beam evaporation coating machine, sealing the vacuum chamber, evacuating gradually to a vacuum level of $3 \times 10^{-3}$ to $6 \times 10^{-3}$ Pa, bombarding the evaporation material $Al_2O_3$ with accelerated electrons by using an electron gun, and adjusting the unwinding speed, the rewinding speed and the evaporation rate, with the $Al_2O_3$ absorbing heat and being vaporized, to form a layer of $Al_2O_3$ coating, that is, a bonding force enhancement layer on the surfaces of the moving thin film;

Step S2: feeding the thin film coated with $Al_2O_3$ obtained in step S1 to the vacuum chamber of the double-side roundtrip electron beam evaporation coating machine, sealing the vacuum chamber, evacuating gradually to a vacuum level of $4 \times 10^{-2}$ to $6 \times 10^{-2}$ Pa, heating a evaporation device to 1300-1400° C., then delivering aluminum to the evaporation device, and adjusting the unwinding speed, the rewinding speed, and the evaporation rate, with the aluminum being continuously melted and evaporated in the evaporation device, to form a layer of aluminum coating, that is, an aluminum metal coating layer, on the surfaces of the moving thin film; and S3: feeding the thin film coated with aluminum obtained in S2 to the vacuum chamber of the coating machine, sealing the vacuum chamber, evacuating gradually to a vacuum level of $3 \times 10^{-3}$ to $6 \times 10^{-3}$ Pa, bombarding the evaporation material $Al_2O_3$ with accelerated electrons by using an electron gun, and adjusting the unwinding speed, the rewinding speed and the evaporation rate, with the $Al_2O_3$ absorbing heat and being vaporized, to form a layer of $Al_2O_3$ coating, that is, an anti-oxidization layer on the surfaces of the moving think film. Use of the positive electrode current collector provided in the present invention is mainly in batteries and particularly in lithium ion batteries.

Therefore, a positive electrode current collector having a multilayered structure is obtained.

The positive electrode current collector obtained in Example 1 is used in a lithium ion battery, in which the most basic functions of the positive electrode current collector are to collect current and support the positive electrode material as a carrier. That is, the current generated by the positive electrode material (battery active material) is collected so as to form a larger current for output.

The positive electrode current collector obtained in Example 1 is tested, and the following conclusions are drawn from the test results:

(1) Weight reduction is achieved by means of the plastic thin film layer, where the aluminum coated film collector can achieve a weight reduction of 50%, and a thickness reduction of 30%, whereby the energy density of the battery is significantly improved.

(2) The plastic thin film, as a substrate, has strong tensile strength, so that the tension, pressure and other windows in the preparation process are widened. Therefore, in the preparation procedure, a higher pressure can be applied to achieve a greater compaction density, thereby improving the manufacturing capability of the process.

(3) The bonding force enhancement layer is coated, which can reduce the exfoliation of the aluminum metal coating layer, and effectively prevent the loss of performances of the collector caused by the potential peeling off of the aluminum metal coating layer.

(4) The anti-oxidation layer is coated, with which the problem that the aluminum coating on the plastic trends to peel off is solved, and the purpose of preventing oxidation is achieved.

The detailed descriptions above are merely specific illustrations of feasible embodiments of the present invention, and the protection scope of the present invention is not limited thereto. Equivalent embodiments or changes can be made without departing from the technical spirit of the present invention, which are all embraced in the protection scope of the present invention.

What is claimed is:

1. A positive electrode current collector, having a multilayered structure and comprising a plastic thin film, wherein upper and lower surfaces of the plastic thin film are coated with a bonding force enhancement layer, an aluminum metal coating layer and an anti-oxidization layer in sequence, wherein the plastic thin film is OPP, PI, PET, CPP, or PVC.

2. The positive electrode current collector according to claim 1, wherein the plastic thin film has a thickness of 2-12 μm.

3. The positive electrode current collector according to claim 1, wherein the bonding force enhancement layer is a metallic coating formed by Ni.

4. The positive electrode current collector according to claim 1, wherein the bonding force enhancement layer is a nonmetallic coating formed by SiC, $Si_3N_4$, or $Al_2O_3$.

5. The positive electrode current collector according to claim 1, wherein the bonding force enhancement layer has a thickness of 10-100 nm.

6. The positive electrode current collector according to claim 1, wherein the aluminum metal coating layer has a thickness of 100-2000 nm.

7. The positive electrode current collector according to claim 1, wherein the anti-oxidization layer is a dense metallic layer formed by Ni; and when the anti-oxidization layer is a nonmetallic layer, the nonmetal is $Al_2O_3$, $Si_3N_4$ or SiC.

8. The positive electrode current collector according to claim 1, wherein the anti-oxidization layer is a dense nonmetallic layer formed by $Al_2O_3$, $Si_3N_4$ or SiC.

9. The positive electrode current collector according to claim 1, wherein the anti-oxidization layer has a thickness of 10-100 nm.

10. A method for preparing a positive electrode current collector having a multilayered structure and comprising a plastic thin film wherein upper and lower surfaces of the plastic thin film are coated with a bonding force enhancement layer, an aluminum metal coating layer and an anti-oxidization layer in sequence, comprising the steps of:

S1: treating surfaces of a plastic thin film to be coated with corona, then feeding the plastic thin film which is in a wound form to a vacuum chamber in a double-side roundtrip electron beam evaporation coating machine, sealing the vacuum chamber, evacuating gradually to a vacuum level of $3 \times 10^{-3}$ to $6 \times 10^{-3}$ Pa, bombarding evaporation material $Al_2O_3$ with accelerated electrons by using an electron gun, and adjusting unwinding speed, rewinding speed and evaporation rate, with the $Al_2O_3$ absorbing heat and being vaporized, to form a layer of $Al_2O_3$ coating, that is, the bonding force enhancement layer, on the surfaces of the moving thin film;

S2: feeding the thin film coated with $Al_2O_3$ obtained in step S1 to the vacuum chamber of the double-side roundtrip electron beam evaporation coating machine, sealing the vacuum chamber, evacuating gradually to a vacuum level of $4 \times 10^{-2}$ to $6 \times 10^{-2}$ Pa, heating an evaporation device to 1300° C.-1400° C., then delivering aluminum to the evaporation device, and adjusting unwinding speed, rewinding speed, and evaporation rate, with the aluminum being persistently melted and evaporated in the evaporation device, to form a layer of aluminum coating, that is, the aluminum metal coating layer, on the surfaces of the moving thin film; and S3: feeding the thin film coated with aluminum obtained in S2 to the vacuum chamber of the coating machine, sealing the vacuum chamber, evacuating gradually to a vacuum level of $3 \times 10^{-3}$ to $6 \times 10^{-3}$ Pa, bombarding evaporation material $Al_2O_3$ with accelerated electrons by using an electron gun, and adjusting unwinding speed, rewinding speed and evaporation rate, with the $Al_2O_3$ absorbing heat and being vaporized, to form a layer of $Al_2O_3$ coating, that is, the anti-oxidization layer, on the surfaces of the moving thin film.

11. A battery comprising the positive electrode current collector according to claim 1.

* * * * *